United States Patent
Shen et al.

(10) Patent No.: US 12,020,084 B2
(45) Date of Patent: Jun. 25, 2024

(54) SERVICE INSTANCE DEPLOYMENT METHOD AND APPARATUS, ELECTRONIC DEVICE, AND STORAGE MEDIUM

(71) Applicant: INSPUR SUZHOU INTELLIGENT TECHNOLOGY CO., LTD., Jiangsu (CN)

(72) Inventors: Shengli Shen, Jiangsu (CN); Kaiyuan Qi, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/005,945

(22) PCT Filed: Feb. 19, 2021

(86) PCT No.: PCT/CN2021/076872
§ 371 (c)(1),
(2) Date: Jan. 18, 2023

(87) PCT Pub. No.: WO2022/021850
PCT Pub. Date: Feb. 3, 2022

(65) Prior Publication Data
US 2023/0289238 A1    Sep. 14, 2023

(30) Foreign Application Priority Data
Jul. 28, 2020    (CN) .......................... 202010738665.8

(51) Int. Cl.
G06F 9/50    (2006.01)
G06F 8/60    (2018.01)
G06F 9/455    (2018.01)

(52) U.S. Cl.
CPC .............. *G06F 9/5083* (2013.01); *G06F 8/60* (2013.01); *G06F 9/45516* (2013.01); *G06F 9/5016* (2013.01)

(58) Field of Classification Search
CPC ...... G06F 9/5083; G06F 8/60; G06F 9/45516; G06F 9/5016
See application file for complete search history.

(56) References Cited

U.S. PATENT DOCUMENTS

| | | | |
|---|---|---|---|
| 2014/0188825 A1 | 7/2014 | Muthukkaruppan et al. | |
| 2015/0121371 A1* | 4/2015 | Gummaraju | G06F 16/182 718/1 |

(Continued)

FOREIGN PATENT DOCUMENTS

| | | |
|---|---|---|
| CN | 103259688 A | 8/2013 |
| CN | 108549717 A | 9/2018 |

(Continued)

OTHER PUBLICATIONS

International search report for PCT/CN2021/076872 dated May 20, 2021.

(Continued)

*Primary Examiner* — Sisley N Kim
(74) *Attorney, Agent, or Firm* — Dennemeyer & Associates LLC; Victoria Friedman

(57) ABSTRACT

Provided are a service instance deployment method and apparatus, an electronic device, and a computer-readable storage medium. The method comprises: creating multiple processes in a target physical node, wherein each process is a RegionServer component and is used for executing one service instance; allocating a flag character to each service instance, and allocating a corresponding port to each service instance based on the flag character, wherein the flag character allocated to each service instance is used as a system parameter of the process corresponding to the service (Continued)

instance; and creating a corresponding log file and a corresponding Process Identification (pid) file for each service instance based on the flag character.

18 Claims, 2 Drawing Sheets

(56) References Cited

U.S. PATENT DOCUMENTS

| | | | |
|---|---|---|---|
| 2016/0179494 A1 | 6/2016 | Pavlov et al. | |
| 2019/0303479 A1* | 10/2019 | Behm | G06F 16/24547 |
| 2020/0097847 A1* | 3/2020 | Convertino | G06F 11/3447 |
| 2020/0210455 A1* | 7/2020 | Margel | H04L 43/20 |
| 2020/0394163 A1* | 12/2020 | Wang | G06F 16/215 |
| 2021/0263780 A1* | 8/2021 | Ou | G06F 9/505 |

FOREIGN PATENT DOCUMENTS

| | | |
|---|---|---|
| CN | 109032674 A | 12/2018 |
| CN | 109257440 A | 1/2019 |
| CN | 110519100 A | 11/2019 |
| CN | 110825660 A | 2/2020 |

OTHER PUBLICATIONS

Chinese search report for 202010738665.8 filed on Jul. 28, 2020.
Ren Chun Duo Du Shu, "Single-Node Deployment of multiple RegionServers", https://blog.csdn.net/qq_35440040/article/details/79444064,Mar. 5, 2018 (Mar. 5, 2018), 1-10.

* cited by examiner

SERVICE INSTANCE DEPLOYMENT METHOD AND APPARATUS, ELECTRONIC DEVICE, AND STORAGE MEDIUM

CROSS-REFERENCE TO RELATED APPLICATIONS

This is a 35 U.S.C. 371 National Stage Patent Application of International Application No. PCT/CN2021/076872, filed Feb. 19, 2021, which claims priority to Chinese application 202010738665.8, filed Jul. 28, 2020, each of which is hereby incorporated by reference in its entirety.

TECHNICAL FIELD

The present disclosure relates to the technical field of computers, and in particular to a service instance deployment method and apparatus, an electronic device, and a computer-readable storage medium.

BACKGROUND

A RegionServer of a Hadoop Database (HBASE, which is a column-oriented and scalable distributed storage system with high reliability and high performance) provides specific data query and insertion, manages a region where data is stored, and has a relatively high requirement on memories. However, a single RegionServer is not recommended to use too much memory, which is prone to cause a Juliet pause, and is not conductive to stability. An Ambari management platform supports the installation of only one RegionServer instance on one node by default, and therefore physical resources may not be fully and effectively utilized under a special HBASE physical cluster.

Therefore, how to deploy multiple service instances on the same physical node, fully use the resources of one physical node and improve the stability of the HBASE cluster is a technical problem to be solved by those having ordinary skill in the art.

SUMMARY

Embodiments of the present disclosure provide a service instance deployment method and apparatus, an electronic device, and a computer-readable storage medium, which may deploy multiple instances on the same physical node, fully use resources of one physical node, and improve the stability of an HBASE cluster.

The embodiments of the present disclosure provide a service instance deployment method, which may include the following operations.

Multiple processes are created in a target physical node, wherein each process is a RegionServer component and is used for executing one service instance.

A flag character is allocated to each service instance, and a corresponding port is allocated to each service instance based on the flag character, wherein the flag character allocated to each service instance is used as a system parameter of the process corresponding to the service instance.

A corresponding log file and a corresponding Process Identification (pid) file are created for each service instance based on the flag character.

Herein, the operation of allocating the corresponding port to each service instance based on the flag character may include the following operation.

A command line corresponding to each service instance is added at a position of a main function parameter based on the flag character so as to overwrite a port configuration of the HBASE to allocate the corresponding port to each service instance.

Herein, the service instance deployment method may further include the following operation.

A command line corresponding to each service instance is added at a set position of a Java Virtual Machine (JVM) so as to use the flag character allocated to each service instance as the system parameter of the process corresponding to the service instance.

Herein, the service instance deployment method may further include the following operations.

A RegionServer component corresponding to each service instance is added in a meta-information configuration file of an HBASE service of Ambari based on the flag character.

A role corresponding to each service instance is added in a role operation sequence file of the HBASE service of Ambari based on the flag character, and an execution sequence of operations corresponding to respective roles is configured, wherein the role corresponding to the service instance includes the RegionServer component corresponding to the service instance.

A corresponding operation execution script is created for each service instance based on the flag character so as to execute the corresponding operation execution script according to the execution sequence of the operations.

Herein, the service instance deployment method may further include the following operation.

An alarm module corresponding to each service instance is added in an alarm configuration file of an HBASE service of Ambari based on the flag character, so that each alarm module detects whether the port corresponding to the service instance is used every first preset time, and gives an alarm for the service instance corresponding to an unused port.

Herein, the service instance deployment method may further include the following operation.

An alarm content of each alarm module is acquired every second preset time, an alarm node containing the service instance for which the alarm is given is determined, and the number of all alarm nodes is counted.

Herein, the service instance deployment method may further include the following operations.

Monitoring indexes corresponding to each service instance are added in a monitoring component of Ambari based on the flag character, so that the monitoring component monitors all the monitoring indexes of each service instance.

A monitoring module corresponding to each service instance is added in a monitoring index configuration file of the HBASE service of Ambari based on the flag character, so that each monitoring module acquires all the monitoring indexes of the corresponding service instance from the monitoring component.

A monitoring window corresponding to each service instance is added in a window tool configuration file of the HBASE service of Ambari based on the flag character, so that each monitoring window displays all the monitoring indexes of the corresponding service instance.

The embodiments of the present disclosure provide a service instance deployment apparatus, which may include: a first creation module, an allocation module, and a second creation module.

The first creation module may be configured to create multiple processes in a target physical node, wherein each process is a RegionServer component and is used for executing one service instance.

The allocation module may be configured to allocate a flag character to each service instance, and allocate a corresponding port to each service instance based on the flag character, wherein the flag character allocated to each service instance is used as a system parameter of the process corresponding to the service instance.

The second creation module may be configured to create a corresponding log file and a corresponding pid file for each service instance based on the flag character.

The embodiments of the present disclosure provide an electronic device, which may include a memory and a processor.

The memory may be configured to store a computer program.

The processor may be configured to implement operations of the above service instance deployment method when executing the computer program.

The embodiments of the present disclosure provide a computer-readable storage medium, on which a computer program is stored. When executed by a processor, the computer program implements the operations of the above service instance deployment method.

From the above solutions, the service instance deployment method provided by the embodiments of the present disclosure includes that: multiple processes are created in the target physical node, wherein each process is a RegionServer component and is used for executing one service instance; the flag character is allocated to each service instance, and the corresponding port is allocated to each service instance based on the flag character, wherein the flag character allocated to each service instance is used as the system parameter of the process corresponding to the service instance; and the corresponding log file and the corresponding pid file are created for each service instance based on the flag character.

According to the service instance deployment method provided by the embodiments of the present disclosure, the RegionServer of the HBASE deploys multiple instances on the same physical node, which may relieve the pressure on a single RegionServer under the condition of the same region number, reduce the occurrence of the Juliet pause under the condition of the same total memory usage, improve the stability of the HBASE cluster, more fully use the physical resources of the cluster, deploy more RegionServer instances without physical capacity expansion, and reduce the capacity expansion cost in some scenarios. The embodiments of the present disclosure also provide a service instance deployment apparatus, an electronic device, and a computer-readable storage medium, which may also achieve the above technical effects.

It is to be understood that the above general description and the following detailed description are only exemplary and not intended to limit the present disclosure.

BRIEF DESCRIPTION OF THE DRAWINGS

In order to more clearly illustrate the embodiments of the present disclosure or the technical solutions in the related art, the drawings used in the description of the embodiments or the related art will be briefly described below. It is apparent that the drawings described below are only some embodiments of the present disclosure. Other drawings may further be obtained by those having ordinary skill in the art according to these drawings without creative efforts. The drawings are used to provide a further understanding of the present disclosure, constitute a part of the specification, and are used to explain the present disclosure together with the following exemplary implementation, but not to limit the present disclosure. In the drawings.

DETAILED DESCRIPTION

The technical solutions in the embodiments of the present disclosure will be clearly and completely described in conjunction with the drawings in the embodiments of the present disclosure. It is apparent that the described embodiments are only a part of the embodiments of the present disclosure, and not all of the embodiments of the present disclosure. All other embodiments obtained by those having ordinary skill in the art based on the embodiments of the present disclosure without creative efforts are within the scope of the present disclosure.

The embodiments of the present disclosure disclose a service instance deployment method, which may deploy multiple service instances on the same physical node, fully use the resources of one physical node and improve the stability of an HBASE cluster.

Figure 1:
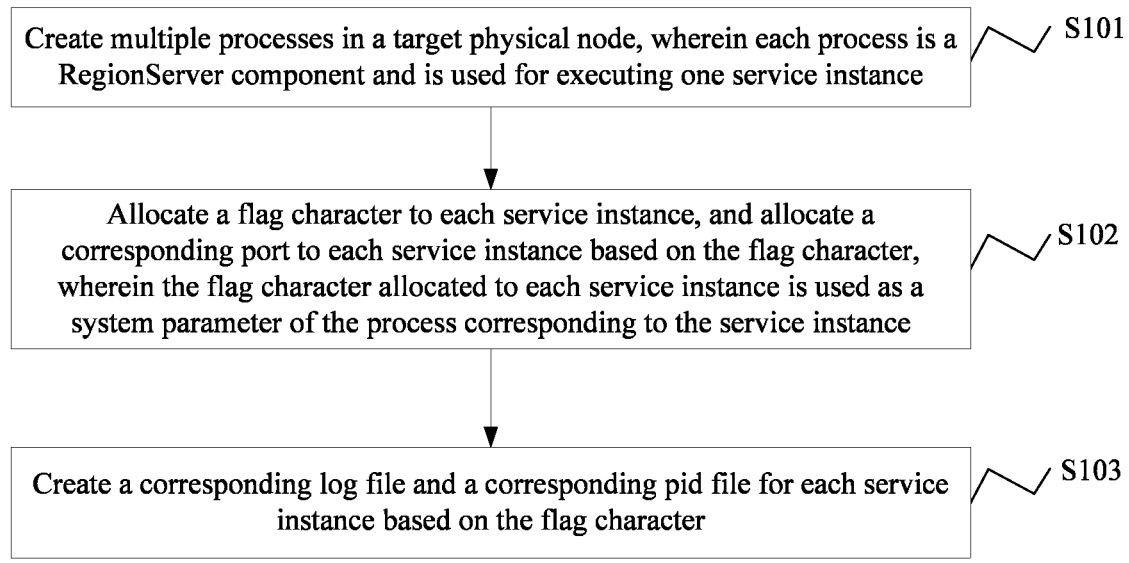
FIG. 1 is a flow diagram of a service instance deployment method provided according to some exemplary embodiments.

Referring to FIG. 1, a flow diagram of a service instance deployment method provided according to some exemplary embodiments, as shown in FIG. 1, includes the following operations.

At S101, multiple processes are created in a target physical node, wherein each process is a RegionServer component and is used for executing one service instance.

An executive body of the implementation is a management node of a HBASE cluster with the purpose of deploying multiple service instances on the same physical node. In the embodiments, multiple processes are created in the same target physical node, wherein each process is a RegionServer component and is used for executing one service instance (namely, a RegionServer instance), namely, processing in response to a read-write request of a user. The service instance is a data processing and computing unit in an HBASE, and is configured to maintain pre-write logs, read or write in caches, and manage multiple Regions.

At S102, a flag character is allocated to each service instance, and a corresponding port is allocated to each service instance based on the flag character, wherein the flag character allocated to each service instance is used as a system parameter of the process corresponding to the service instance.

In some exemplary implementations, the executive mode of the HBASE is transformed, so that the HBASE may identify a flag character of a service instance in an execution command when the RegionServer instance is operated. Preferably, the flag character of each service instance may be realized by adding a suffix to a parameter RegionServer, a corresponding RegionServer instance may be started based on the flag character, and corresponding system parameters and port configurations, etc. are added to different service instances according to different flag characters when a JAVA process is started.

In some exemplary implementations, the operation of allocating the corresponding port to each service instance based on the flag character includes that: a command line corresponding to each service instance is added at a position of a main function parameter based on the flag character so as to overwrite a port configuration of the HBASE to allocate the corresponding port to each service instance. In the embodiments, the service instance deployment method may further include that: a command line corresponding to each service instance is added at a set position of a JVM so as to use the flag character allocated to each service instance as the system parameter of the process corresponding to the service instance. In some exemplary implementations, when the JAVA process is finally started, three pairs of information are added to a java command line (java[options]classname [args]) by means of "-D parameter name=parameter value", among the three pairs of information, one pair of information is added to the position of the "options" JVM configuration so as to use the flag character as the system parameter of the process, and the other two pairs of information are added to the position of the "args" main function parameter so as to overwrite two port related configurations of the HBASE, so that two different ports are allocated to the service instances of different flag characters.

At S103, a corresponding log file and a corresponding pid file are created for each service instance based on the flag character.

Figure 2:
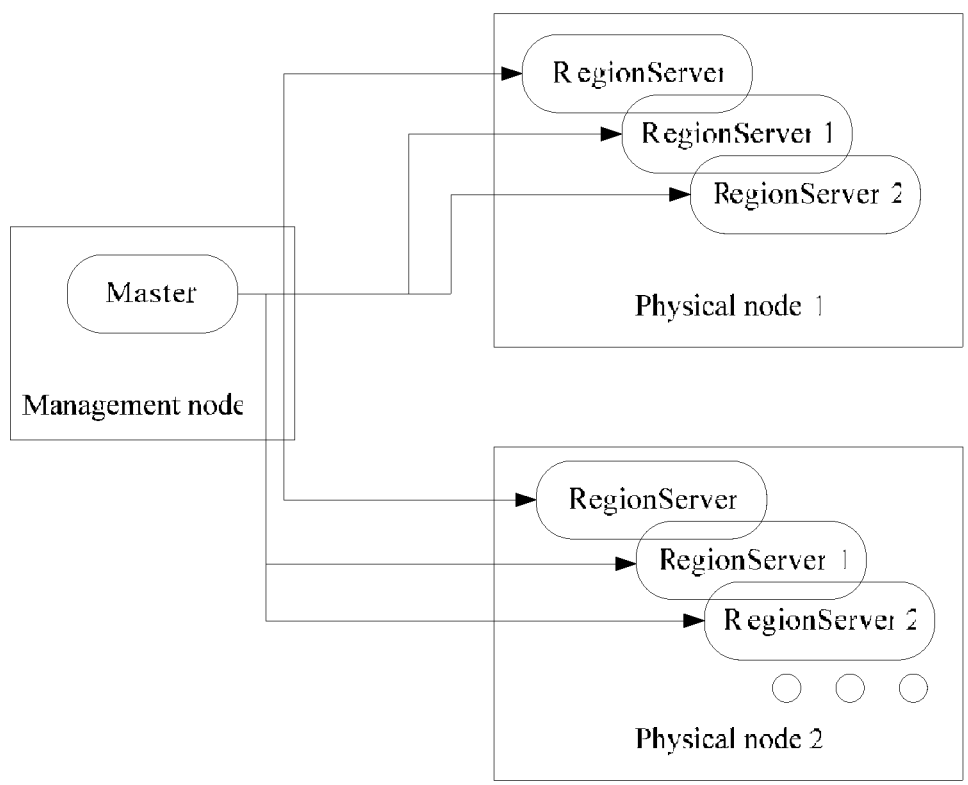
FIG. 2 is a structural diagram of an HBASE cluster provided according to some exemplary embodiments.

In this operation, the corresponding log file and the corresponding pid (Process Identification) file are created for different service instances. The Pid file is a text file which contains only one line recording the ID of the corresponding process. The file is named based on the flag character of the service instance for use of the corresponding process so as to deploy multiple service instances on a target physical node. As shown in FIG. 2, the HBASE cluster includes two physical nodes, three service instances are deployed on each physical node, the identification of each service instance being RegionServer, regionServer1 and RegionServer2 respectively. A Master in the management node is connected to each service instance in each physical node respectively.

In some exemplary implementations of the embodiments, the service instance deployment method may further include that: a RegionServer component corresponding to each service instance is added in a meta-information configuration file of an HBASE service of Ambari based on the flag character; a role corresponding to each service instance is added in a role operation sequence file of the HBASE service of Ambari based on the flag character, and an execution sequence of operations corresponding to respective roles is configured, wherein the role corresponding to the service instance includes the RegionServer component corresponding to the service instance; and a corresponding operation execution script is created for each service instance based on the flag character so as to execute the corresponding operation execution script according to the execution sequence of the operations.

In some exemplary implementations, background execution operations corresponding to the page operations of the RegionServer component of the HBASE service of Ambari (a Web-based tool supporting the provisioning, management and monitoring of an Apache Hadoop cluster) are transformed, so that the operations (such as starting, stopping, restarting, opening a security mode and automatically restarting) of newly added RegionServer components with different suffixes may be executed, and the correct sequence is followed when operating the HBASE service as a whole. In the meta-information configuration file in a directory of the HBASE service of Ambari, the newly added RegionServer components with different suffixes may execute the transformed operations of the RegionServer components in the Ambari. In the transformed operations, the part that needs to be executed after the security mode is opened and other common parts of the RegionServer, such as user group permission check, still follow the original execution flow of the RegionServer. The part that finally calls the execution command of the HBASE, such as starting, stopping and restarting, may add the suffix on the basis of the original parameter RegionServer when using the execution command of the HBASE. In the role operation sequence file in the directory of the HBASE service of Ambari, the newly added HBASE-RegionServer roles with different suffixes and the HBASE-RegionServer may be executed in sequence at the same level.

According to the service instance deployment method provided by the embodiments of the present disclosure, the RegionServer of the HBASE deploys multiple instances on the same physical node, which may relieve the pressure on a single RegionServer under the condition of the same region number, reduce the occurrence of the Juliet pause under the condition of the same total memory usage, improve the stability of the HBASE cluster, more fully use the physical resources of the cluster, deploy more RegionServer instances without physical capacity expansion, and reduce the capacity expansion cost in some scenarios.

Based on the above embodiments, in some exemplary implementations, the service instance deployment method may further include that: an alarm module corresponding to each service instance is added in an alarm configuration file of an HBASE service of Ambari based on the flag character, so that each alarm module detects whether the port corresponding to the service instance is used every first preset time, and gives an alarm for the service instance corresponding to an unused port.

In some exemplary implementations, HBASE RegionServer modules with different suffixes, namely, alarm modules, newly added in the alarm configuration file in an HBASE service configuration directory of Ambari may enable Ambari to detect at intervals different ports corresponding to nodes where the components with the suffixes are located, and may display a red HBASE RegionServer warning message with the suffix on a page and display an error content when the port is not detected to be in use.

In some exemplary implementations of the embodiments, the service instance deployment method may further include that: an alarm content of each alarm module is acquired every second preset time, an alarm node containing the service instance for which the alarm is given is determined, and the number of all alarm nodes is counted.

In some exemplary implementations, in the server module, a newly added sub-module with a suffix may enable Ambari to detect the monitoring content of the above module at intervals, and when the above module gives an alarm, the total number of the nodes and the alarm nodes of the components with the suffix is counted.

It can be seen that in the embodiments, an alarm may be triggered after the newly added RegionServer component with the suffix breaks down on some nodes, and the number of normal RegionServer components and the number of abnormal RegionServer components may be displayed.

Based on the above embodiments, in some exemplary implementations, the service instance deployment method may further include that: monitoring indexes corresponding to each service instance are added in a monitoring component of Ambari based on the flag character, so that the monitoring component monitors all the monitoring indexes of each service instance; a monitoring module corresponding to each service instance is added in a monitoring index configuration file of the HBASE service of Ambari based on the flag character, so that each monitoring module acquires all the monitoring indexes of the corresponding service instance from the monitoring component; and a monitoring window corresponding to each service instance is added in the window tool configuration file of the HBASE service of Ambari based on the flag character, so that each monitoring window displays all the monitoring indexes of the corresponding service instance.

In some exemplary implementations, the flow of collection of monitoring information of Ambari at the background is transformed, different marks are added to a monitoring index name of the corresponding process as suffixes to form, according to the flag character of each service instance, new index names that distinguish the same monitoring content of different processes, and the new index names are stored in a back-end storage of the monitoring component of Ambari. In the monitoring index configuration file in the HBASE service configuration directory of Ambari, the monitoring index names of the newly added HBASE RegionServer modules with different suffixes, namely, the monitoring modules, completely correspond to the above new index names, so that Ambari may take the monitoring index contents of the processes where the RegionServer components with different suffixes are located from the back-end storage of the monitoring component. In the window tool configuration file in the HBASE service configuration directory of Ambari, the newly added monitoring windows with different suffixes display corresponding monitoring contents of the RegionServer components with different suffixes on the page, such as a hotspot graph HBASE Region number and monitoring read-write times. In a sub-module of the monitoring window, a monitoring index name required to be operated by each monitoring window completely corresponds to the above index name to which the suffix is added, so that the monitoring windows with different suffix names may display specific monitoring information of different RegionServer processes where the RegionServer components with different suffix names are located. Similar to the above, the window may also be customized to display other monitoring information about the RegionServer components with different suffixes.

It can be seen that in the embodiments, various monitoring items of the newly added RegionServers with suffixes and various customized combination monitoring information may be displayed.

An application embodiment provided by the embodiments of the present disclosure is described below. A service instance deployment may include a background operation module, a page operation module, an alarm module, and a monitoring module. The implementation of the above modules may include the following operations.

At S1, the background operation module is realized, and the executive mode of the HBASE is transformed, so that the suffix added to the parameter "RegionServer" in the command executed when the original operation RegionServer instance is executed may be identified, and different RegionServer instances may be started.

At S2, the page operation module is realized, a background execution operation corresponding to the page operation of the RegionServer component of the HBASE service of Ambari is transformed, so that the operations of the newly added RegionServer components with different suffixes, such as starting, stopping, restarting, opening a security mode and automatically restarting, may be executed, and a correct sequence is followed when operating the HBASE service as a whole.

At S3, the alarm module is realized, after the newly added RegionServer component with the suffix breaks down on some nodes, an alarm may also be triggered as an original RegionServer, and the number of normal RegionServer components and the number of abnormal RegionServer components may be displayed.

At S4, the monitoring module is realized, various monitoring items of the newly added RegionServer with the suffix and various custom combination monitoring may be displayed as the original RegionServer component.

A service instance deployment apparatus provided by the embodiments of the present disclosure is described below, and the service instance deployment apparatus described below and the service instance deployment method described above may be referred to each other.

Figure 3:
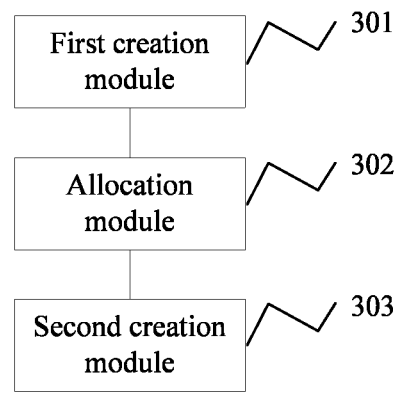
FIG. 3 is a structural diagram of a service instance deployment apparatus provided according to some exemplary embodiments.

Referring to FIG. 3, a structural diagram of a service instance deployment apparatus provided according to some exemplary embodiments, as shown in FIG. 3, includes: a first creation module 301, an allocation module 302, and a second creation module 303.

The first creation module 301 is configured to create multiple processes in a target physical node, wherein each process is a RegionServer component and is used for executing one service instance.

The allocation module 302 is configured to allocate a flag character to each service instance, and allocate a corresponding port to each service instance based on the flag character, wherein the flag character allocated to each service instance is used as a system parameter of the process corresponding to the service instance.

The second creation module 303 is configured to create a corresponding log file and a corresponding pid file for each service instance based on the flag character.

According to the service instance deployment apparatus provided by the embodiments of the present disclosure, the RegionServer of the HBASE deploys multiple instances on the same physical node, which may relieve the pressure on a single RegionServer under the condition of the same region number, reduce the occurrence of the Juliet pause under the condition of the same total memory usage, improve the stability of the HBASE cluster, more fully use the physical resources of the cluster, deploy more RegionServer instances without physical capacity expansion, and reduce the capacity expansion cost in some scenarios.

Based on the above embodiments, in some exemplary implementations, the allocation module 302 is configured to allocate a flag character to each service instance, add a command line corresponding to each service instance at a position of a main function parameter based on the flag character so as to overwrite a port configuration of the HBASE to allocate the corresponding port to each service instance.

Based on the above embodiments, in some exemplary implementations, the service instance deployment apparatus may further include: a first adding module.

The first adding module is configured to add a command line corresponding to each service instance at a set position of a JVM so as to use the flag character allocated to each service instance as the system parameter of the process corresponding to the service instance.

Based on the above embodiments, in some exemplary implementations, the service instance deployment apparatus may further include: a second adding module, a third adding module, and a third creation module.

The second adding module is configured to add a RegionServer component corresponding to each service instance in a meta-information configuration file of an HBASE service of Ambari based on the flag character.

The third adding module is configured to add a role corresponding to each service instance in a role operation sequence file of the HBASE service of Ambari based on the flag character, and configure an execution sequence of operations corresponding to respective roles, wherein the role corresponding to the service instance includes the RegionServer component corresponding to the service instance.

The third creation module is configured to create a corresponding operation execution script for each service instance based on the flag character so as to execute the corresponding operation execution script according to the execution sequence of the operations.

Based on the above embodiments, in some exemplary implementations, the service instance deployment apparatus may further include: a fourth adding module, a fifth adding module, and a sixth adding module.

The fourth adding module is configured to add monitoring indexes corresponding to each service instance in a monitoring component of Ambari based on the flag character, so that the monitoring component monitors all the monitoring indexes of each service instance.

The fifth adding module is configured to add a monitoring module corresponding to each service instance in a monitoring index configuration file of the HBASE service of Ambari based on the flag character, so that each monitoring module acquires all the monitoring indexes of the corresponding service instance from the monitoring component.

The sixth adding module is configured to add a monitoring window corresponding to each service instance in a window tool configuration file of the HBASE service of Ambari based on the flag character, so that each monitoring window displays all the monitoring indexes of the corresponding service instance.

Based on the above embodiments, in some exemplary implementations, the service instance deployment apparatus may further include an alarm module.

The alarm module is configured to add an alarm module corresponding to each service instance in an alarm configuration file of an HBASE service of Ambari based on the flag character, so that each alarm module detects whether the port corresponding to the service instance is used every first preset time, and gives an alarm for the service instance corresponding to an unused port.

Based on the above embodiments, in some exemplary implementations, the service instance deployment apparatus may further include a statistical module.

The statistical module is configured to acquire an alarm content of each alarm module is acquired every second preset time, determine an alarm node containing the service instance for which the alarm is given, and count the number of all alarm nodes.

With respect to the device in the above embodiments, the specific mode in which the various modules perform operations has been described in detail in the embodiments of the service instance deployment method, which will not be described in detail herein.

Figure 4:
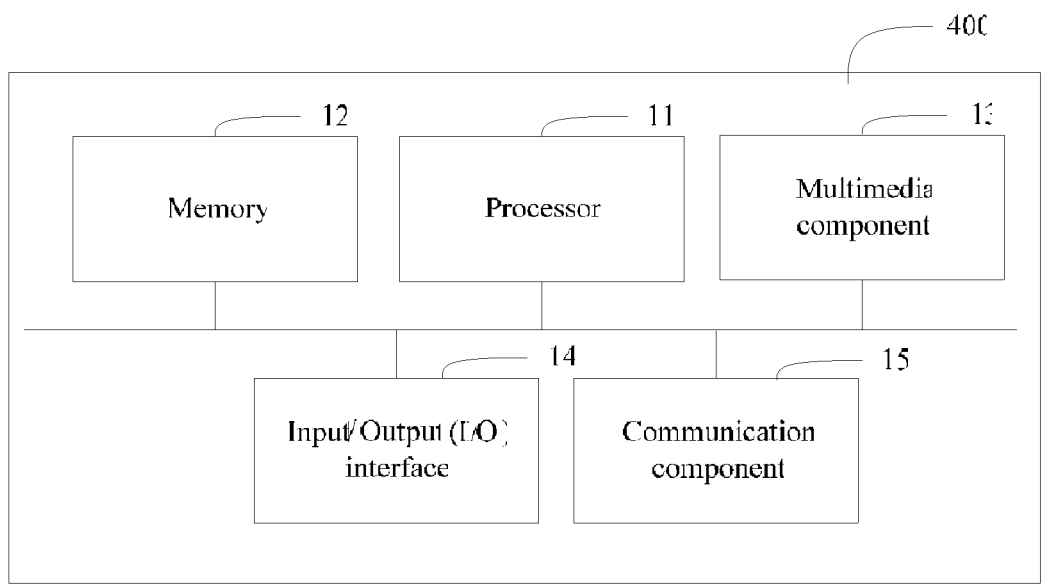
FIG. 4 is a structural diagram of an electronic device provided according to some exemplary embodiments.

The embodiments of the present disclosure provide an electronic device, referring to FIG. 4, which is a structural diagram of an electronic device provided by the embodiments of the present disclosure, the electronic device may include: a processor 11 and a memory 12. The electronic device 400 may also include one or more of a multimedia component 13, an Input/Output (I/O) interface 14, and a communication component 15.

Herein, the processor 11 is configured to control the overall operation of the electronic device 400 to complete all or part of the operations in the above service instance deployment method. The memory 12 is configured to store various types of data to support the operation of the electronic device. Such data may include, for example, instructions for any application programs or methods operated on the electronic device 400, as well as application-related data. The memory 12 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk. The multimedia component 13 may include a screen, for example, a touch screen. The I/O interface 14 provides an interface between the processor 11 and other interface modules, which may be a keyboard, a mouse, buttons, and the like. These buttons may be virtual buttons or physical buttons. The communication component 15 is configured for wired or wireless communication between the electronic device 400 and other devices. Wireless communication may include, for example, one or a combination of Wi-Fi, Bluetooth, Near Field Communication (NFC), 2G, 3G or 4G, so that the communication component 15 may include: a Wi-Fi module, a Bluetooth module, and an NFC module correspondingly.

In an exemplary embodiment, the electronic device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above service instance deployment method.

In another exemplary embodiment, a computer-readable storage medium including a program instruction is also provided, and the program instruction is executed by a processor to implement the operations of the above service instance deployment method. For example, the computer-readable storage medium may be the above memory 12 including the program instruction executed by the processor 11 of the electronic device 400 to complete the above service instance deployment method.

The various embodiments in the present specification are described in a progressive manner, and each embodiment focuses on differences from other embodiments, and the same similar parts between the various embodiments can be referred to each other. For the apparatus disclosed in the embodiments, since it corresponds to the service instance deployment method disclosed in the embodiments, the description is relatively simple, and the relevant parts can be referred to the method part. It is to be noted that a number of variations and modifications may be made by those having ordinary skill in the art without departing from the principle of the present disclosure, and all fall within the scope of protection of the claims of the present disclosure.

It is also to be noted that relational terms "first", "second" and the like in the specification are adopted only to distinguish one entity or operation from another entity or operation and not always to require or imply existence of any such practical relationship or sequence between the entities or operations. Furthermore, terms "include" and "contain" or any other variant thereof is intended to cover nonexclusive inclusions herein, so that a process, method, object or device including a series of elements not only includes those elements but also includes other elements which are not clearly listed or may further include elements intrinsic to the process, the method, the object or the device. Under the condition of no more limitations, an element defined by the statement "including a/an . . . " does not exclude existence of the same other elements in a process, method, object or device including the element.

What is claimed is:

1. A service instance deployment method, comprising:
    creating multiple processes in a target physical node, wherein each process is a RegionServer component and is used for executing one service instance, and the service instance is a data processing and computing unit in an HBASE, and is configured to maintain pre-write logs, read or write in caches, and manage multiple Regions;
    allocating a flag character to each service instance, and allocating a corresponding port to each service instance based on the flag character, wherein the flag character allocated to each service instance is used as a system parameter of the process corresponding to the service instance; and
    creating a corresponding log file and a corresponding Process Identification (pid) file for each service instance based on the flag character;
    further comprising:
    adding a RegionServer component corresponding to each service instance in a meta-information configuration file of a Hadoop Database (HBASE) service of Ambari based on the flag character;
    adding a role corresponding to each service instance in a role operation sequence file of the HBASE service of Ambari based on the flag character, and configuring an execution sequence of operations corresponding to respective roles, wherein the role corresponding to the service instance comprises the RegionServer component corresponding to the service instance; and
    creating a corresponding operation execution script for each service instance based on the flag character so as to execute the corresponding operation execution script according to the execution sequence of the operations.

2. The service instance deployment method according to claim 1, wherein allocating the corresponding port to each service instance based on the flag character comprises:
    adding a command line corresponding to each service instance at a position of a main function parameter based on the flag character so as to overwrite a port configuration of a Hadoop Database (HBASE) to allocate the corresponding port to each service instance.

3. The service instance deployment method according to claim 1, further comprising:
    adding a command line corresponding to each service instance at a set position of a Java Virtual Machine (JVM) so as to use the flag character allocated to each service instance as the system parameter of the process corresponding to the service instance.

4. The service instance deployment method according to claim 1, further comprising:
    adding an alarm module corresponding to each service instance in an alarm configuration file of a Hadoop Database (HBASE) service of Ambari based on the flag character, so that each alarm module detects whether the port corresponding to the service instance is used every first preset time, and gives an alarm for the service instance corresponding to an unused port.

5. The service instance deployment method according to claim 4, further comprising:
    acquiring an alarm content of each alarm module every second preset time, determining an alarm node containing the service instance for which the alarm is given, and counting the number of all alarm nodes.

6. The service instance deployment method according to claim 1, further comprising:
    adding monitoring indexes corresponding to each service instance in a monitoring component of Ambari based on the flag character, so that the monitoring component monitors all the monitoring indexes of each service instance;
    adding a monitoring module corresponding to each service instance in a monitoring index configuration file of a Hadoop Database (HBASE) service of Ambari based on the flag character, so that each monitoring module acquires all the monitoring indexes of the corresponding service instance from the monitoring component; and
    adding a monitoring window corresponding to each service instance in a window tool configuration file of the HBASE service of Ambari based on the flag character, so that each monitoring window displays all the monitoring indexes of the corresponding service instance.

7. The service instance deployment method according to claim 1, wherein the flag character of each service instance is realized by adding a suffix to a parameter RegionServer, a corresponding RegionServer instance is started based on the flag character, and corresponding system parameters and port configurations are added to different service instances according to different flag characters when a JAVA process is started.

8. The service instance deployment method according to claim 1, wherein different marks are added to a monitoring index name of the corresponding process as suffixes to form, according to the flag character of each service instance, new index names that distinguish the same monitoring content of different processes.

9. The service instance deployment method according to claim 6, wherein in the window tool configuration file in a configuration directory of the HBASE service of Ambari, newly added monitoring windows with different suffixes display corresponding monitoring contents of the RegionServer components with different suffixes.

10. An electronic device, comprising:
    a memory, configured to store a computer program; and
    a processor, when executing the computer program, configured to:
    create multiple processes in a target physical node, wherein each process is a RegionServer component and is used for executing one service instance, and the service instance is a data processing and computing unit in an HBASE, and is configured to maintain pre-write logs, read or write in caches, and manage multiple Regions;
    allocate a flag character to each service instance, and allocate a corresponding port to each service instance based on the flag character, wherein the flag character allocated to each service instance is used as a system parameter of the process corresponding to the service instance; and create a corresponding log file and a corresponding Process Identification (pid) file for each service instance based on the flag character;
wherein the processor, when executing the computer program, is further configured to:
add a RegionServer component corresponding to each service instance in a meta-information configuration file of a Hadoop Database (HBASE) service of Ambari based on the flag character;
add a role corresponding to each service instance in a role operation sequence file of the HBASE service of Ambari based on the flag character, and configure an execution sequence of operations corresponding to respective roles, wherein the role corresponding to the service instance comprises the RegionServer component corresponding to the service instance; and
create a corresponding operation execution script for each service instance based on the flag character so as to execute the corresponding operation execution script according to the execution sequence of the operations.

11. The electronic device according to claim 10, wherein the processor, when executing the computer program, is configured to:
add a command line corresponding to each service instance at a position of a main function parameter based on the flag character so as to overwrite a port configuration of a Hadoop Database (HBASE) to allocate the corresponding port to each service instance.

12. The electronic device according to claim 10, wherein the processor, when executing the computer program, is further configured to:
add a command line corresponding to each service instance at a set position of a Java Virtual Machine (JVM) so as to use the flag character allocated to each service instance as the system parameter of the process corresponding to the service instance.

13. The electronic device according to claim 10, wherein the processor, when executing the computer program, is further configured to:
add an alarm module corresponding to each service instance in an alarm configuration file of a Hadoop Database (HBASE) service of Ambari based on the flag character, so that each alarm module detects whether the port corresponding to the service instance is used every first preset time, and gives an alarm for the service instance corresponding to an unused port.

14. The electronic device according to claim 13, wherein the processor, when executing the computer program, is further configured to:
acquire an alarm content of each alarm module every second preset time, determine an alarm node containing the service instance for which the alarm is given, and count the number of all alarm nodes.

15. The electronic device according to claim 10, wherein the processor, when executing the computer program, is further configured to:
add monitoring indexes corresponding to each service instance in a monitoring component of Ambari based on the flag character, so that the monitoring component monitors all the monitoring indexes of each service instance;
add a monitoring module corresponding to each service instance in a monitoring index configuration file of a Hadoop Database (HBASE) service of Ambari based on the flag character, so that each monitoring module acquires all the monitoring indexes of the corresponding service instance from the monitoring component; and
add a monitoring window corresponding to each service instance in a window tool configuration file of the HBASE service of Ambari based on the flag character, so that each monitoring window displays all the monitoring indexes of the corresponding service instance.

16. The electronic device according to claim 10, wherein the processor, when executing the computer program, is further configured to:
realize the flag character of each service instance by adding a suffix to a parameter RegionServer, start a corresponding RegionServer instance based on the flag character, and add corresponding system parameters and port configurations to different service instances according to different flag characters when a JAVA process is started.

17. The electronic device according to claim 10, wherein the processor, when executing the computer program, is further configured to:
add different marks to a monitoring index name of the corresponding process as suffixes to form, according to the flag character of each service instance, new index names that distinguish the same monitoring content of different processes.

18. A non-transitory computer-readable storage medium, wherein a computer program is stored on the computer-readable storage medium, and when executed by a processor, the computer program implements the following operations:
creating multiple processes in a target physical node, wherein each process is a RegionServer component and is used for executing one service instance, and the service instance is a data processing and computing unit in an HBASE, and is configured to maintain pre-write logs, read or write in caches, and manage multiple Regions;
allocating a flag character to each service instance, and allocating a corresponding port to each service instance based on the flag character, wherein the flag character allocated to each service instance is used as a system parameter of the process corresponding to the service instance; and
creating a corresponding log file and a corresponding Process Identification (pid) file for each service instance based on the flag character;
wherein when executed by the processor, the computer program further implements the following operations;
adding a RegionServer component corresponding to each service instance in a meta-information configuration file of a Hadoop Database (HBASE) service of Ambari based on the flag character;
adding a role corresponding to each service instance in a role operation sequence file of the HBASE service of Ambari based on the flag character, and configuring an execution sequence of operations corresponding to respective roles, wherein the role corresponding to the service instance comprises the RegionServer component corresponding to the service instance; and
creating a corresponding operation execution script for each service instance based on the flag character so as to execute the corresponding operation execution script according to the execution sequence of the operations.

* * * * *